Patented July 31, 1945

2,380,706

UNITED STATES PATENT OFFICE 2,380,706

PRODUCTION OF REFINED WOOD PULP

George A. Richter, Rochester, N. Y., assignor to Eastman Kodak Company, Rochester, N. Y., a corporation of New Jersey No Drawing. Application May 1, 1942,
Serial No. 441,344

8 Claims. (Cl. 260—229)

This invention relates to the production of chemical wood pulp and more particularly a refined wood cellulose that is very suitable for conversion into cellulose acetate and other cellulose derivatives by subjecting a mercerized or partially mercerized product to the reactivating action of the alkali metal salt of a weak acid.

It is well known that the ordinary grades of wood pulp are not suitable for acetylation and that if they are subjected to the well known esterification steps, they yield products that are inferior in color and clarity when such acetates are dissolved in acetone or other similar solvents. The literature contains many references to ways and means for ridding wood pulps of those constituents which are largely responsible for the objectionable residues that carry through to the acetate products. Most of the wood cellulose purification processes so designed are based on the principle of removal of hemi-cellulose and pentosan by means of alkali. A common method of approach is to digest an acid liberated wood pulp with weak caustic soda solution at elevated temperature. Such treatment removes substantial portions of the less stable cellulose and of the pentosan groups and yields a product that contains from ninety-four to ninety-six per cent alpha cellulose. When this type of fiber is acetylated and the acetate hydrolyzed in the usual manner the secondary ester forms an acetone solution which is definitely superior to a corresponding product that has been made from the unpurified fiber, but it does not equal the clarity and the color of acetate solutions prepared from good cotton.

Other known methods for purifying a wood pulp that is intended for acetylation resort to the application of relatively cold strong alkali solutions. When the wood cellulose is so treated more of the non alpha cellulose groups are eliminated than can be readily extracted with the more dilute hot alkalies. By such treatments, which mercerize or partially mercerize the cellulose, it is easily possible to produce products that have as high as ninety-eight and even ninety-nine per cent alpha cellulose and with pentosan contents of well below one per cent. Unfortunately, cellulose so purified is relatively inert and does not respond satisfactorily to the usual acetylation processes. When so treated they yield partially acetylated products that are wholly unsuitable for commercial use. Only by very radical changes in acetylation procedures can such highly purified cellulose be converted into satisfactory acetates. One may, for instance, activate the otherwise inert fiber by exposing it to the action of acetic acid at an elevated temperature for a considerable time before it is ultimately exposed to the catalyst and the acetic anhydride reactant; or one can avoid the drying of the purified fiber and remove the attached water by displacement with acetic acid, in which case the fiber may then be acetylated reasonably well by ordinary procedures. In either of the two cases cited, special and costly steps are required of the acetylator.

The inertness of the dry purified fiber is believed to be due to an increased density of fiber structure from shrinkage of the alkali-swollen cellulose on drying. Semi-mercerized or mercerized cellulose has not found common use in the acetylation industry because of the special and expensive steps which the acetylator must adopt, if he is to use this particular type of purified wood cellulose satisfactorily.

The mercerized and partially mercerized celluloses to which my invention relates are those which have been treated with aqueous caustic alkali of at least 10% concentration usually at a temperature between about 20° C. and 50-55° C. As the strength of the alkali solution increases the greater is the degree of mercerization up to about 18%; from this point on complete mercerization is usually obtained.

An object of the present invention is to make possible the practical adoption of a highly refined wood cellulose for acetylation without the necessity of resorting to special processes by the acetylator. I have found that this is possible by subjecting the mercerized or semi-mercerized cellulose resulting from treatment with strong alkali solutions to a special reactivation. The new procedure is designed for pulps that depend upon the use of strong caustic liquors for the elimination of hemi-cellulose and pentosan groups.

The process step for chemically reactivating an alkali refined wood cellulose depends essentially on treating the alkali refined fiber with suitably chosen chemicals in aqueous solution at elevated temperatures. The cause of the reactivation is not known, although it is believed that it can be in part explained by a change in the character of the cellulose gel that results when the cellulose is swollen by alkalies. The activating properties of the reagents that have been found most suitable for the reactivation step suggests that a mild hydrolysis of the swollen cellulose at elevated temperature occurs in this treatment.

The reactivating solutions that have been used are the aqueous solutions of water-soluble alkali metal or ammonium salts of weak acids such as the sulfites, borates, acetates, carbonates, and the like. The alkali-metal sulfites have been particularly effective in bringing out the desired results. Splendid reactivation can be accomplished with solutions that contain from one to three per cent chemical and at temperatures that may range from 140° C. to 160° C. When such reactivated fiber is subsequently bleached, washed, and dried, it retains the chemical activity that has been imparted and when the dried fiber is then subjected to the regular acetylation process it esterifies easily to yield on hydrolysis a secondary acetate that dissolves in acetone to give a solution of splendid clarity and substantially free of the blue haze that ordinarily accompanies a wood cellulose acetate dope.

One general example of procedure falling within the purview of my invention may be substantially as follows. A suitable wood such as spruce is chipped as usual and cooked with bisulfite solution under pressure and temperature in a closed container such as regularly used in the pulping of wood. Conditions should preferably be so selected that the delignification is carried out without undue injury to the cellulose itself. If the acid composition is properly chosen and the conditions of the cook are properly prescribed less severe refining steps will be necessary to reduce pentosans to sufficiently low levels to assure an ultimate acetylation that will yield products of high solution clarity. For instance a bisulfite cooking liquor that contains less than 1% combined SO₂ operating in this manner will give a well-cooked pulp readily susceptible to a refining treatment with alkali. It must be noted, however, that whereas special care in pulping is advantageous, it is not absolutely essential since less carefully cooked pulps can be brought to high quality end products but with somewhat greater losses and more cost in the refining steps. Assuming that the pulping step has been carefully carried out, a western hemlock pulp so prepared will have a pentosan content of from 2.5% to 3.5% and will respond readily to the refining sequence. The unbleached pulp may be first exposed to a chlorine solution in which roughly 3% chlorine based on pulp is used. The attack of the chlorine on the ligneous constituents of the pulp proceeds normally at room temperature so that it is largely consumed in about one hour. The fiber is then washed and bleached with from 3% to 5% of bleach powder based on pulp. Bleach powder is calculated on a 35% available chlorine basis. At this stage in the sequence the fiber is substantially white, and contains about ninety per cent alpha cellulose and 2% pentosans. The washed fiber is further refined by immersing it in sodium hydroxide solution of at least 10% and at a temperature that may range from 20° C. to 60° C., depending on the concentration of alkali selected. It is preferred to operate with sodium hydroxide solution of 12% strength at a temperature of about 45° C. For best results with the higher concentrations of alkali higher temperatures should be used. A one to two hour treatment with the strong caustic liquor usually suffices. The wood fiber is then washed preferably under conditions that will allow a substantial recovery of the chemical. At this stage in the sequence the fiber has an alpha cellulose content of about 95% to 98%. Pentosans are below 1% and frequently in the neighborhood of .6% to .8%. If this product is then dried to upwards of 96% dryness, except with special presteps already mentioned, the fiber responds poorly to the regular acetylation procedures in spite of the fact that it is highly purified. As already stated, a special treatment is needed to restore its chemical reactivity.

Ordinarily the mercerized or the partially mercerized cellulose is not first dried before it is subjected to the reactivating treatment, although it is to be noted that if for some reason the drying step is to be practiced, it does not interfere with the reactivation by treatment in accordance with my invention. A typical reactivation is carried out with a 2% sodium sulfite solution. The treatment is made in a pressure vessel of suitable construction. The stock consistency may vary depending upon the facilities for proper agitation and application of heat. An 8% to 10% fiber consistency is quite satisfactory, although higher concentrations may be used where economies in process result.

Ordinarily a temperature of about 150° C. for a period of two hours for the reactivation will bring about the desired result. However celluloses which have been treated with an alkali of more than 16% concentration require appreciably longer times of treatment with a reactivating agent to reactivate properly. The reactivation step sometimes causes a slight increase in alpha cellulose content and may also result in a minor reduction in pentosan groups. However, this change in composition does not necessarily result. The treatment is followed by a removal of spent liquor and a washing of the stock. At this stage the fiber may be dried by some recognized procedure and is then ready for acetylation by one of the commonly used processes. On the other hand, if for some reason additional improvement in color is desired, the reactivated product may be further bleached before it is finally dried and esterified.

Many variations in sequence of treatments may be adopted so long as the alkali refinement is followed by a reactivation step. One may, for instance, omit the initial chlorination step and resort to bleach powder or some other suitable oxidant in preparing the stock for the alkali purification step; or one may start with certain grades of commercially bleached pulps as a base product. In some cases it is desirable to insert a mild alkaline refining step at some point prior to the treatment with the strong caustic liquor.

The exact conditions under which the strong alkaline solutions are applied may be varied depending upon the character of the pulp to be treated, its history, and the quality of the ultimate acetate to be emphasized. One may deliberately add reducing agents such as sulfides, if it is important to maintain as high a solution viscosity as possible in the final product. On the other hand, if lower viscosities are required, or if improved color is of paramount importance, hypochlorite or some other suitable oxidant may be added to the strong alkali. The chosen concentration and temperature of the alkaline solution may differ with different types of base stock. In general, well cooked pulps will require a less severe treatment to reduce the objectionable constituents to a sufficiently low level. For such pulps the necessary elimination of hemi-cellulose and pentosan groups can be attained by the application of solutions that contain from 10 to 15% sodium hydroxide and at a temperature of 40° C. to 50° C.

As already noted, recovery of strong liquor from the treated stock offers no unusual difficulty. There is ordinarily but little contamination and much of the recovered liquor can be reused directly after suitable refortification. Secondary portions of recovered alkali in the form of liquor that is to dilute to reuse advantageously in subsequent treatments of new pulp may be used as a base to prepare the bleach liquor that is required, or may be converted to sodium sulfite and used in the reactivation step that follows. In fact it may prove desirable in some instances to allow a calculated amount of the spent alkali to remain in the strong alkali treated stock and to convert it to sulfite by admixture of sulfurous acid to the pulp suspension.

Although excellent results have been obtained in the reactivation step with 2% sodium sulfite solutions at about 150° C., several variations in procedure have been explored with good success. One can, for instance, use a mixture of sodium sulfite and sodium carbonate for reactivating the cellulose. In certain cases borax solutions are effective. The reactivating of the cellulose can be carried out at any pH between 7.8 and 9 although the best results have been obtained when the pH of the treating solution was maintained between 7.8 and 8.4. This is easily achieved with a two per cent sodium sulfite solution. When sodium sulfite is employed to reactivate the cellulose in accordance with my invention very little chemical is actually consumed and a good recovery and reuse of chemical is possible. Any recovered sodium sulfite which is too dilute to use directly in the reactivation step can be returned to the bisulfite cooking liquor used for pulping wood chips.

As already mentioned, pulps from different wood sources can be used satisfactorily. Pulps obtained from the northeastern spruces and hardwoods, the western hemlocks, and the southern pines and deciduous species respond to the described sequence of treatments satisfactorily.

Although pulps that have been produced by the acid sulfite cooking process are best suited for use in processes in accordance with my invention, surprisingly good results are possible with base pulps that have been produced by alkaline cooking procedures. Kraft type wood pulps which have been bleached and refined by processes previously described in the literature are not at all suitable for acetylation. When such material is exposed to the action of acetylation agents there is little response and one obtains a mass of unacteylated and partially acetylated fiber residues that have no value. If, however, the kraft pulp is properly and adequately bleached by a series of treatments with chlorine and hypochlorite liquor, then subjected to the action of relatively strong caustic liquors at slightly above room temperature, and subsequently reactivated with a hot activating solution in much the same manner as previously described, the product, either as is, or after further bleaching, will acetylate reasonably well to yield an acetate that has commercial value.

A specific example of fiber purification is given to illustrate the several steps of a suitable refining sequence. A bleached hemlock sulfite pulp such as used by the rayon industry, in a 4% stock suspension was treated with a 12% sodium hydroxide solution at a temperature of 50° C. for a period of one hour. It was then washed free of excess alkali. At this stage the intermediate product had the following properties:

| | | |
|---|---|---|
| Alpha cellulose | percent | 95.7 |
| Pentosans | do | 0.8 |
| Copper number | | .92 |
| Cuprammonium viscosity | poises | 4.57 |

This product was then further treated with a 2% sodium sulfite solution. A temperature of 160° C. was maintained for two hours, at the end of which time the fiber was again washed. The reactivated fiber had the following tests:

| | | |
|---|---|---|
| Alpha cellulose | percent | 96.1 |
| Pentosans | do | 0.8 |
| Copper number | | .36 |
| Cuprammonium viscosity | poises | 4.12 |

A mild bleach step followed. This was carried out with 2% bleach based on weight of cellulose and at 35° C. for two hours. The pulp was again washed, treated with dilute sulfurous acid, and washed again. It was then dried at about 60° C. This final product was then tested. Test results follow:

| | | |
|---|---|---|
| Alpha cellulose | percent | 97.0 |
| Pentosans | do | .7 |
| Copper number | | .35 |
| Cuprammonium viscosity | poises | 3.53 |

A product was also prepared from another portion of the same base pulp in the same manner but omitting the reactivation step.

The two wood pulp products as well as a sample of high quality cotton linters were then acetylated in the manner ordinarily employed to prepare commercial cellulose acetate under identical conditions. The acetic acid dopes of primary acetates were then evaluated by color and clarity comparisons. Color was graded relatively and in all cases was rated as good. Clarity was determined by measuring the distance through which the outline of a wire could be distinguished when submerged in the dope under standard conditions of lighting. Distance is expressed in centimeters. The cotton acetate dope showed a reading of 17, the unreactivated wood cellulose acetate a value of 6, and the corresponding product prepared from the purified and reactivated wood cellulose a value of 24. These differences are typical of a host of others that were established experimentally.

Although the preferred conditions of operation for the reactivation of the cellulose have been stated to be a concentration of activating salt between 1 and 3%, and a temperature of 140–160° C., it is to be understood that these limits are by no means critical. For instance, percentages of salt up to 10% or even greater may be employed but no better reactivation is accomplished and the cost of the process is increased by the greater concentrations. Also, if desired, higher or lower temperatures of treatment may be employed. As, however, temperatures of treatment much below 140° C. such as those from 50° C. to 140° C. require a longer time to accomplish reactivation of the cellulose, unless appreciably greater than 2% $Na_2SO_3$ solutions are employed, they will be used only infrequently, while the savings in time obtained in using temperatures much above 160° C. such as from 160° up to 200 or 250° C. will not be sufficient to justify the use of the increased amount of heat necessary to operate the process at such temperature, and at such higher temperature a great sacrifice in yield and in solution viscosity is experienced.

It is to be understood that the term "acetylation" used herein refers to those esterification processes which result in the cellulose esters of the lower fatty acids such as cellulose acetate, cellulose acetate propionate, cellulose acetate butyrate, cellulose acetate caproate, cellulose propionate and cellulose butyrate. It is to provide a starting material for these processes that my invention is particularly concerned. When a treatment of pulp with chemical of a given concentration is referred to herein, the concentration is figured on the entire liquor surrounding the pulp, thus taking into account the water in which the pulp is suspended as well as that in which the chemical is in solution, if added in that form.

Although my invention has been described with reference to wood cellulose or wood pulp, it is to be understood that similar results are obtained by the treatment of other cellulose materials such as cotton, cotton linters, bagasse, ramie or other cellulose material of which the refining thereof with strong alkali and subsequent reactivation is desirable.

I claim:

1. A process of preparing wood pulp for acetylation purposes which comprises treating the pulp with aqueous caustic alkali of at least 10% strength until at least partial mercerization has occurred followed by treating the pulp with an aqueous solution of an alkali metal salt of a weak acid at an elevated temperature.

2. A process for preparing wood pulp for use in an acetylation process which comprises treating the pulp with strong caustic alkali until at least partial mercerization has occurred and subsequently treating the pulp with an aqueous solution of an alkali metal salt of a weak acid at a temperature of 140-160° C.

3. In a process of preparing wood pulp for use in an acetylation process in which the cellulose is treated with aqueous caustic alkali having mercerizing properties, until at least partial mercerization has occurred the step which comprises treating the pulp at some time after this mercerizing treatment with an aqueous solution of an alkali metal salt of a weak acid at an elevated temperature to prevent shrinkage of the fibers of the pulp.

4. A process for preparing wood pulp for acetylation which comprises treating the pulp with caustic alkali having a concentration of at least 10% until at least partial mercerization has occurred and subsequently treating the pulp with a dilute aqueous solution of sodium sulfite at an elevated temperature.

5. A method of preparing chemical wood pulp for use in a cellulose acetylation process which comprises treating the pulp with strong aqueous caustic alkali until at least partial mercerization has occurred and subsequently treating the pulp with an aqueous solution of the alkali metal salt of a weak acid having a concentration of 1-3% at a temperature of 140-160° C.

6. A process of preparing a bleached sulfite wood pulp for use in a cellulose acetylation process which comprises treating the pulp with a solution of sodium hydroxide of at least 10% strength until at least partial mercerization has occurred and subsequently treating the pulp with an aqueous solution of sodium sulfite of 1-3% concentration at a temperature of 140-160° C.

7. A process of preparing a bleached sulfite pulp for use with a cellulose acetylation process which comprises treating the pulp with a solution of caustic alkali of at least 10% strength until at least partial mercerization has occurred and subsequently treating the pulp with an aqueous solution of sodium sulfite at a temperature of 140-160° C. and a pH of 7.8-8.4.

8. A process of preparing wood pulp for acetylation purposes, which comprises treating the pulp with sodium hydroxide solution of 12% strength at a temperature of about 45° C. until at least partial mercerization has occurred, followed by treating the pulp with an aqueous solution of sodium sulfite at an elevated temperature.

GEORGE A. RICHTER.